United States Patent Office 3,663,648
Patented May 16, 1972

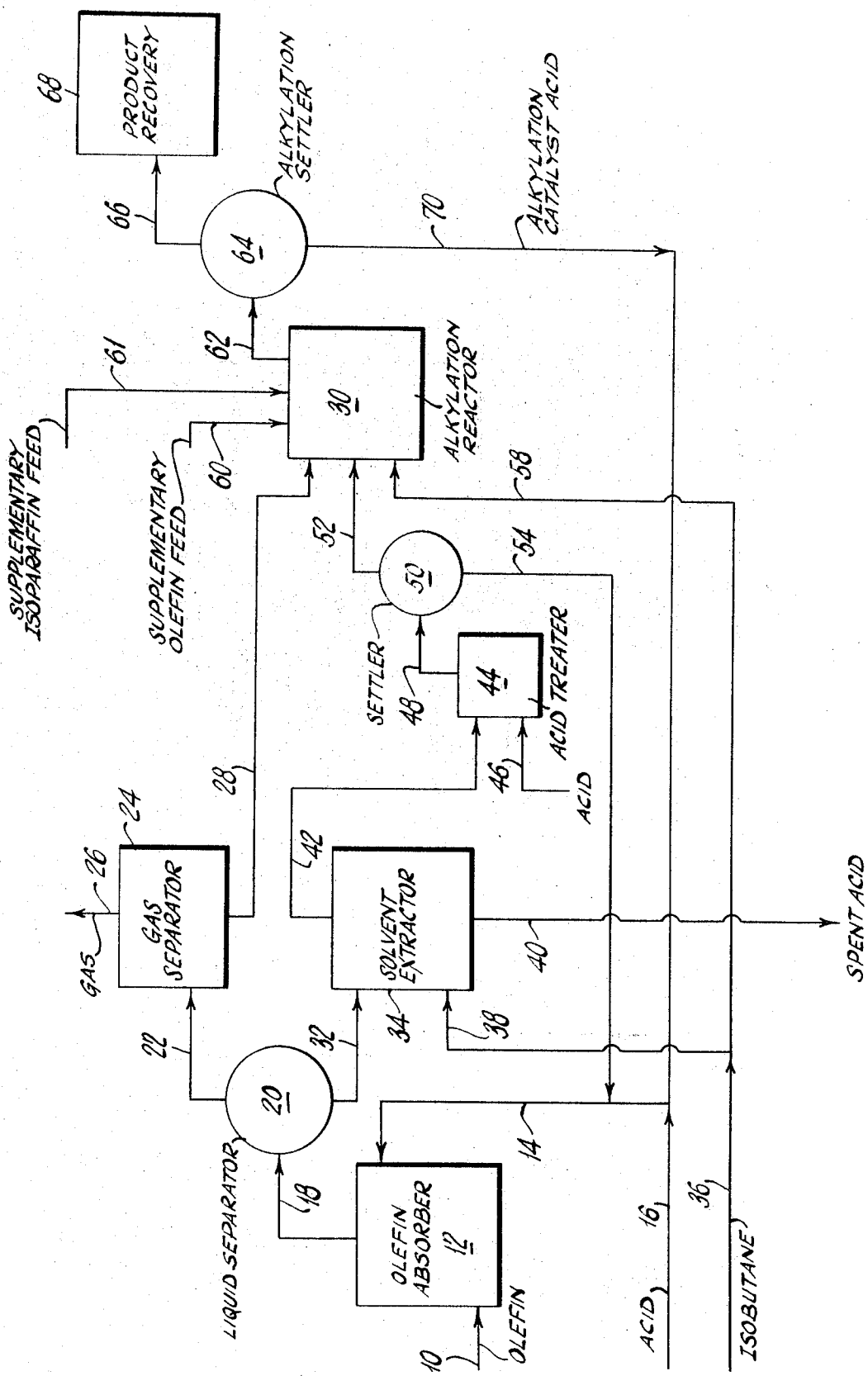

3,663,648
ISOPARAFFIN ALKYLATION WITH DIALKYL SULFATES INCLUDING THE ABSORPTION, EXTRACTION AND ACID-TREATMENT THEREOF
Raymond J. Ruble, Dobbs Ferry, N.Y., assignor to Texaco Development Corporation, New York, N.Y.
Filed Oct. 6, 1970, Ser. No. 78,537
Int. Cl. C07c 3/54
U.S. Cl. 260—683.61          1 Claim

ABSTRACT OF THE DISCLOSURE

Isoparaffin-olefin alkylation provides for $C_3$–$C_5$ olefin absorption with used sulfuric acid. A hydrocarbon phase containing a minor portion of dialkyl sulfates is separated, gaseous components are removed, and the degassed hydrocarbon phase is passed to the alkylation reaction. The acid phase containing a major portion of dialkyl sulfates is extracted with an isoparaffin hydrocarbon solvent; the extract is treated with concentrated sulfuric acid; the acid-treated extract is passed to the alkylation reaction, and the treating acid is passed to the absorption reaction. The dialkyl sulfates are alkylated with isoparaffin in the presence of an alkylation acid, which is formed in the reaction of said dialkyl sulfates with said isoparaffin.

BACKGROUND OF THE INVENTION

Field of the invention

This invention is directed to improvements in the alkylation of isoparaffins with olefin-based materials in the presence of concentrated sulfuric acid alkylation catalyst for the production of alkylate of high quality based on internal combustion engine operating standards. More particularly it is directed to a three-stage alkylation process which is an improvement over a combination of an alkylation process with the so-called sulfuric acid recovery process. The invention operates in a unique and novel manner to bring about the formation of high anti-knock performace alkylate and is concerned with a three-stage alkylation process wherein olefin charge is reacted with used alkylation acid catalyst, the olefin-acid reacted mix is extracted with an isoparaffin hydrocarbon solvent and the extract is passed to an alkylation zone wherein alkylene is formed and used acid catalyst is recycled to the absorption step.

DESCRIPTION OF THE PRIOR ART

In the well known sulfuric acid alkylation process of the prior art, light olefin hydrocarbons having from three to five carbon atoms per molecule are reacted with an isoparaffin hydrocarbon having from four to five carbon atoms per molecule. The reaction takes place in the presence of strong sulfuric acid catalyst having a titratable acidity higher than about 88% when alkylating $C_4$ hydrocarbons and higher than about 85% when alkylating $C_5$ hydrocarbons. Reacted mix in the alkylation reactor is withdrawn from the reactor and separated into a hydrocarbon phase containing alkylate product and unreacted hydrocarbons and an acid phase containing acid and alkylation contaminants, the alkylation contaminants comprising water and acid-oil complex formed during the alkylation reaction. In the prior art, a portion of the separated acid is returned to the alkylation reaction zone and another portion is discarded from the system as used acid in order to prevent build-up of contaminants in the alkylation zone. In a later development, known as two-stage alkylation, a portion of the system acid from the reacted mix separation zone is reacted with a portion of the olefin charge to form alkyl sulfates and the olefin acid reaction product passed to the alkylation reaction zone where the alkyl sulfates are alkylated the isoparaffin. Unfortunately, with this method of operation the alkylation contaminants also are returned to the alkylation reactor along with the alkyl sulfates and consequently, alkylation contaminants build-up in the alkylation reactor with undesirable results. In a further development, known as the sulfuric acid recovery process, the olefin-acid reaction product containing alkyl sulfates is not passed to the alkylation reactor. Instead, the dialkyl sulfates are extracted therefrom with isoparaffin hydrocarbon solvent and the resulting extract solution comprising primarily dialkyl sulfates dissolved in isoparaffin is passed to the alkylation reaction zone. The remaining raffinate acid containing the alkylation contaminants is discarded from the system. In this method the contaminants are not recycled to the alkylation reactor. Alkylation of the dialkyl sulfates with isobutane regenerates 100% sulfuric acid in the alkylation zone, hence the name sulfuric acid recovery process.

SUMMARY OF THE INVENTION

In the present invention, none of the sulfuric acid alkylation catalyst separated from the reacted mix is passed back to the alkylation reactor. Instead, all of the separated catalyst acid is passed to an absorption zone where it is reacted with $C_3$, $C_4$ and/or $C_5$ olefins in an olefin charge stock thereby forming a reaction mixture comprising a heavier phase containing alkyl sulfates and alkylation contaminants and a lighter phase containing primarily unreacted hydrocarbons with a minor portion of dissolved alkyl sulfates. The lighter and heavier phases are separated from each other and the heavier phase is then extracted with a hydrocarbon solvent consisting of the same isoparaffin, normally isobutane, being alkylated in the alkylation zone of the process, thereby forming an extract phase and a raffinate acid phase which are separated from each other. The extract phase comprising a solution of alkyl sulfates, predominantly dialkyl sulfates, in the isoparaffin solvents is treated with a minor portion of the used sulfuric acid alkylation catalyst and the resulting acid phase is separated from the treated phase. The treated extract phase with or without additional isoparaffin, is charged to an alkylation zone wherein a portion of the isoparaffin is alkylated with the dialkyl sulfates, with or without additional olefin, in the presence of sulfuric acid alkylation catalyst resulting from the reaction of alkyl sulfates with isoparaffin. The alkylation reactor effluent is separated into a lighter hydrocarbon phase comprising primarily alkylate and isoparaffin and a heavier alkylation catalyst acid phase. The hydrocarbon phase is passed to a product recovery system for purification and separation by distillation. The separated alkylation catalyst acid phase is returned to the olefin absorption zone referred to above, where it is reacted with the olefin charge stock. The lighter phase separated from the absorption zone reaction mixture is charged to the alkylation zone, either directly or after removing any volatile non-alkylatable components by flash distillation. The acid phase separated from the treated extract phase is charged to the olefin absorption zone along with the used alkylation acid. The raffinate acid phase from the isoparaffin extraction step is discarded from the process as spent acid in an amount such that the amount of water in the spent acid at least equals the total amount of water entering the process with the make-up acid and in association with the hydrocarbon charge stocks, and/or in amount such that the quantity of acid-oil alkylation contaminants discharged in the acid is at least equal to the quantity of acid-oil alkylation contaminants being produced in the process.

BRIEF DESCRIPTION OF THE DRAWING

In the accompanying drawing, the single figure is a schematic flow diagram illustrating a preferred embodiment of the process of the present invention. Although the drawing illustrates an arrangement of apparatus in which the process of this invention may be practiced, it is not intended to limit the invention to the particular apparatus or materals described.

DESCRIPTION OF A PREFERRED EMBODIMENT

Referring to the figure, an olefin-containing feed stream, preferably containing propylene and/or butylene, is passed through line 10 to olefin absorber 12. Sulfuric acid alkylation catalyst from an associated alkylation zone, to be described hereinafter, and having a titratable acidity of at least 95% also is charged to absorber 12 through line 14. Fresh concentrated make-up sulfuric acid optionally may be charged through line 16, if desired, and mixed with catalyst acid in line 14 to replace acid withdrawn from the system. The total reaction mixture in absorber 12 is passed through line 18 to liquid separator 20 where a lighter hydrocarbon phase and a heavier acid phase are separated from each other on the basis of differences in the specific gravities of the two phases. Alternatively, but not shown in the figure, a counterflow tower may be used in place of olefin absorber 12 and liquid separator 20 to obtain both reaction of the olefin with the acid and concurrent separation of the resulting hydrocarbon and acid phases. The hydrocarbon phase in the upper portion of liquid separator 20 is passed through line 22 to gas separator 24 where any lower boiling non-reacted gases, such as ethylene and propane are vented thru line 26. Residual liquid comprising unreacted hydrocarbons and dissolved dialkyl sulfates is passed through line 28 to alkylation reactor 30. The heavier or acid phase in the lower portion of separator 20 is withdrawn through line 32 and passed to the top portion of solvent extractor 34. Isobutane is charged to the process through line 16 and at least a portion through line 36. A portion of the total isobutane feed is passed through line 38 and introduced as a solvent into the lower portion of extractor 34. If isopentane is being alkylated in alkylation reactor 30, then isopentane is used as the solvent in extractor 34 instead of isobutane. Raffinate acid is withdrawn from extractor 34 through line 40 and discharged from the system as spent acid. Extract solution comprising principally isobutane and dialkyl sulfates is passed from solvent extractor 34 through line 42 to acid treater 44 where it is contacted with fresh concentrated sulfuric acid charged to acid treater 44 through line 46. If desired, alkylation catalyst acid from settler 64 may be used instead of fresh acid for charging to acid treater 44. In such case, line 46 would be connected to line 70. The reaction mix from acid treater 44 is passed through line 48 to settler 50 where a phase separation is obtained with the treated hydrocarbon phase passing overhead through line 52 to alkylation reactor 30. The heavier acid phase is withdrawn from the lower portion of settler 50 through line 54. The acid phase from settler 50 is combined with alkylation catalyst acid charged through line 14 to olefin absorber 12. As stated above, unreacted liquid hydrocarbons from olefin absorber 12 and liquid separator 20 are charged to alkylation reactor 30 through line 22, gas separator 24 and line 28. Additionally, acid treated isobutane-dialkyl sulfate extract solution is charged to alkylation reactor 30 from settler 50 through line 52. Additional isobutane also may be supplied to alkylation reactor 30 through lines 36 and 58 as required to attain a desired isobutane concentration in alkylation reactor 30. If desired, additional olefin may be charged to alkylation reactor 30 through line 60. The reaction mix in alkylation reactor 30 is passed through line 62 to alkylation settler 64 where it is separated into a lighter hydrocarbon phase and a heavier alkylation catalyst acid phase. The lighter hydrocarbon phase is withdrawn from the top of alkylation settler 62 and passed through line 66 to product recovery equipment 68 where isobutane and alkylate are recovered. The isobutane may be recharged to the system through line 36. The alkylate is withdrawn as a high octane value motor fuel blending stock. Alkylation catalyst acid separated in alkylation settler 64 is withdrawn from the lower portion of settler 64 and passed through lines 70 and 14 to olefin absorber 12. As stated above, if so desired, a minor portion may be passed through line 46 to acid treater 44 instead of charging fresh acid to treater 44 as shown in the drawing.

In one example of practicing the invention, a mixed olefin feed such as is obtained from a catalytic cracking operation and having the composition shown in Table 1 is charged in liquid phase through line 10 to olefin absorber 12 at a rate of 150 barrels per hour.

TABLE 1

| | Percent by volume |
|---|---|
| Propylene | 18.8 |
| Propane | 11.9 |
| Isobutane | 25.2 |
| n-Butane | 7.7 |
| Butylenes | 34.1 |
| Petane | 2.3 |
| Total | 100.0 |

Simultaneously, alkylation catalyst acid having a titratable acidity of about 97 percent is passed from alkylation settler 64 to absorber 12 at a rate of 25.5 barrels per hour. This is equivalent to a 10% molal excess of olefin over that theoretically required for complete conversion of the sulfuric acid to dialkyl sulfates by reaction with the propylene and butylene contents of the olefin feed stream. The adsorber is maintained at a temperature of 30° F. and a pressure of 125 p.s.i. Under these conditions the reactants are maintained in the liquid phase.

The reaction mixture in absorber 12 is passed to liquid separator 20 where the hydrocarbon and acid phases are separated, as by gravity settling. The hydrocarbon phase comprises unreacted hydrocarbons (including excess propylene and butylenes, propane, n-butane, isobutane, and pentanes) containing in solution a portion of the dialkyl sulfates formed in absorber 12. The total quantity of hydrocarbon phase separated in liquid separator 20 is 97.5 B.P.H., of which 20%, or 19.5 B.P.H., is dialkyl sulfates.

The hydrocarbon phase from separator 20 is passed to gas separator 24 where the lower boiling unreacted components, such as propane, and any ethane which may be present, are vaporized and vented as gas through line 26. In the example, 17.9 B.P.H. of propane is removed as overhead and 79.6 B.P.H, of which 19.5 BPH is dialkyl sulfates, is passed to alkylation reactor 30 as a portion of the charge to that unit The heavier or acid phase in liquid separator 20, which comprises primarily dialkyl sulfates with minor quantities of alkyl acid sulfates, any unreacted sulfuric acid, acid oil complex alkylation contaminants and water, is withdrawn from separator 20 and passed to the upper portion of solvent extraction tower 34 at a rate of 78 B.P.H. Isobutane solvent is charged to solvent extraction tower 34 at a rate of 548 B.P.H. This is equivalent to a isobutane-to-acid phase solvent ratio of 8:1. Extract solution comprising 11.88% by volume of dialkyl sulfate and 0.02% acid oil is produced at a rate of 622 B.P.H. and passed to acid treater 44 where it is treated with 2.5 B.P.H. of fresh 98% sulfuric acid to remove the acid oil from the isobutane-dialkyl sulfate solution. The treated solution is passed to alkylation reactor 30 as the principal charge stock. The treating acid and removed acid oil are separated from the hydrocarbon phase in settler 50 at a rate of 2.63 B.P.H. and passed to olefin absorber 12. In this instance the treating acid constitutes all of the make-up acid required to maintain the acid in the system which is equivalent to an acid consumption of 0.267 lb. of acid per gallon of alkylate produced. The quantity of acid oil removed amounts to about one-half of the acid oil formed in the system. The other half of the acid oil remains in the raffinate acid phase from solvent extractor 34 which discharged from the system as spent acid, as described hereinbefore.

Reaction of the isobutane and dialkyl sulfates in the charge streams takes place in alkylation reactor 30 in the presence of alkylation catalyst acid having a titratable acidity of at least 95%. In the alkylation reactor, hydrocarbon and acid are present in substantially equal volumes and the isobutane concentration is equivalent to 76.5% of the reacted mix. In the event it should be desired to introduce additional olefin or isobutane into the alkylation reactor, this may be done by introducing either or both through lines 60 and 61 respectively. In the present example, alkylate comprising about one-third heptane and two-thirds octane is produced at a rate of 143.5 B.P.H. The alkylate product is of improved antiknock performance quality as compared with the octane values of alkylate produced by the alkylation of charge stocks of corresponding composition employing methods of the prior art. This improvement in clear (unleaded) octane ratings of alkylates prepared in accordance with the present invention makes possible the production of high quality motor fuels with a substantial reduction or complete elimination of tetraethyl lead.

Although the invention has been described in terms of a preferred embodiment, other embodiments and modifications are contemplated without departing from the spirit and scope of the invention. For example, the olefin charge to the absorber may be in either vapor or liquid phase or a combination of both. The temperature maintained in the absorber in determined by the olefin being absorbed but generally will be in the range of 0–60° F. The absorber itself may be operated with vapor as well as liquid phase present. The absorption step is described as including the olefin absorber and liquid separator. In practice it may be preferable to employ a counterflow tower in which case the phase separation inherently takes place within the tower and the liquid separator may be eliminated. Similarly, separation of unreacted gases also may be accomplished in the counterflow tower, thus eliminating the gas separator if so desired. The absorption step also may be carried out with two or more mixer-settler type absorbers in series to produce a countercurrent flow. Whether a tower or mixer type equipment is used, countercurrent flow is preferred as a means of obtaining a high degree of conversion of the acid to dialkyl sulfates, for example of the order of 90% or more.

In the extraction step it is desired to extract as much as possible of the dialkyl sulfates from the absorber acid phase in order to minimize both olefin and acid losses. High solvent dosages of at least 3:1 and preferably of the order of 6:1 and higher and temperatures of less than 100° F., preferably about 40–60° F., are preferred. Extraction conditions usually are selected to approach as nearly as possible the ultimate degree of extraction with only acid-oil reaction product and water remaining in the raffinate acid and all of the alkyl sulfates being recovered in the extract solution or hydrocarbon phase.

Under conditions favoring maximum extraction of the dialkyl sulfates, some of the acid oil contaminant is also extracted with the dialkyl sulfates. This polymeric acid oil is quite unsaturated and reacts readily with strong sulfuric acid, such as alkylation catalyst acid or fresh 98% make-up acid. The reaction product is readily separated and removed from the extract solution by gravity settling prior to charging the extract solution to the alkylation reactor.

Conditions for carrying out the alkylation reaction are well known in the art. It is a feature of the present invention, however, that unlike the methods of the prior art, once the process is underway, sulfuric acid is not introduced as such into the alkylation reactor, nor is acid recycled from the alkylation settler to the alkylation reactor. Consequently, replacement acid in the alkylation reactor is derived entirely from reaction of the dialkyl sulfates with the isoparaffin and the resulting in situ release of substantially 100% sulfuric acid in the alkylation reactor. Akylation therefore takes place in the presence of very strong catalyst acid having a titratable acidity in excess of 95%. As a consequence, the alkylate produced is of higher quality that can be obtained in a system wherein acid is recycled to the alkylation reactor from the alkylation settler. This is reflected in a higher octane rating for alkylate obtained from corresponding charge stocks by the methods of the prior art.

Obviously, many modifications and variations of the invention as hereinabove set forth may be made without departing from the spirit and scope thereof, and therefore, only such limitations should be imposed as are indicated in the appended claim.

I claim:

1. A process of alkylating an isoparaffin hydrocarbon with an olefin-based material in the presence of sulfuric acid alkylation catalyst in an alkylation reaction zone which comprises reacting in an absorber an olefin hydrocarbon having from three to five carbon atoms with used sulfuric acid alkylation catalyst from said alkylation reaction zone forming dialkyl sulfates under conditions such that substantially all of the sulfuric acid content of the alkylation catalyst acid is reacted with said olefin, separating said absorber reaction mixture into an absorber hydrocarbon phase comprising unreacted hydrocarbons containing a minor portion of said dialkyl sulfates dissolved therein and an absorber acid phase containing a major portion of said dialkyl sulfates, removing gaseous components from said absorber hydrocarbon phase, passing the degassed absorber hydrocarbon phase to said alkylation reaction zone, extracting dialkyl sulfates from said absorber acid phase with an isoparaffin hydrocarbon solvent having from four to five carbon atoms yielding an extract phase comprising isoparaffin solvent and dialkyl sulfate and a raffinate acid phase, discarding said raffinate acid phase, treating said extract phase with concentrated sulfuric acid, separating treated extract phase from treating acid, passing said treated extract phase to said alkylation reaction zone, passing said separated treating acid to said absorber, reacting in said alkylation reaction zone said dialkyl sulfates in said degassed absorber hydrocarbon phase and in said treated extract phase with isoparaffin hydrocarbon having from four to five carbon atoms in the presence of said alkylation catalyst acid formed in the reaction of said dialkyl sulfates with said isoparaffin, separating the alkylation reaction mixture into a hydrocarbon phase comprising alkylate and alkylation catalyst acid phase, and passing the total alkylation catalyst acid phase to said absorber as said used sulfuric acid alkylation catalyst.

References Cited

UNITED STATES PATENTS

| | | | |
|---|---|---|---|
| 3,422,164 | 1/1969 | Goldsby | 260—683.62 |
| 3,428,705 | 2/1969 | Goldsby | 260—683.62 |
| 3,442,972 | 5/1969 | Massa | 260—683.62 |
| 3,448,168 | 6/1969 | Goldsby | 260—683.62 |
| 3,534,118 | 10/1970 | Massa | 260—683.62 |
| 3,580,962 | 5/1971 | Moorer et al. | 260—683.61 |

DELBERT E. GANTZ, Primary Examiner

G. J. CRASANAKIS, Assistant Examiner

U.S. Cl. X.R.

260—683.62